US012798300B2

(12) United States Patent
Wischt, Jr. et al.

(10) Patent No.: US 12,798,300 B2
(45) Date of Patent: Nov. 17, 2026

(54) DIRECTIONAL INTERLOCKING SIPE AND/OR SLOT WITH CHAMFER

(71) Applicant: BRIDGESTONE AMERICAS TIRE OPERATIONS, LLC, Nashville, TN (US)

(72) Inventors: Paul J. Wischt, Jr., Barberton, OH (US); David M. Severyn, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/701,749

(22) PCT Filed: Oct. 7, 2022

(86) PCT No.: PCT/US2022/077733
§ 371 (c)(1),
(2) Date: Apr. 16, 2024

(87) PCT Pub. No.: WO2023/064703
PCT Pub. Date: Apr. 20, 2023

(65) Prior Publication Data

US 2025/0196543 A1 Jun. 19, 2025

Related U.S. Application Data

(60) Provisional application No. 63/256,541, filed on Oct. 16, 2021.

(51) Int. Cl.
*B60C 11/12* (2006.01)
*B29D 30/06* (2006.01)

(52) U.S. Cl.
CPC ...... *B60C 11/1218* (2013.01); *B60C 11/1281* (2013.01); *B29D 2030/0613* (2013.01); *B60C 2011/1213* (2013.01)

(58) Field of Classification Search
CPC ............. B60C 11/1218; B60C 11/1281; B60C 2011/1213; B29D 2030/0613
See application file for complete search history.

(56) References Cited

U.S. PATENT DOCUMENTS

2006/0169377 A1* 8/2006 Hashimoto ......... B60C 11/1218 152/DIG. 3
2011/0155293 A1* 6/2011 Berger ................ B60C 11/1281 152/209.24
(Continued)

FOREIGN PATENT DOCUMENTS

CN 102083640 A 6/2011
CN 104105604 A 10/2014
(Continued)

OTHER PUBLICATIONS

Machine translation for German 1480932 (Year: 2025).*
(Continued)

*Primary Examiner* — Steven D Maki

(57) ABSTRACT

In one aspect, a tire is provided, the tire comprising: a tread portion comprising at least one of a tread rib or a tread block, a sipe included in the tread rib or the tread block, the sipe including: a key portion including: a key edge portion angled in a first circumferential direction at an angle KA, and a chamfer portion angled in the first circumferential direction at an angle CA, an upper parallel portion radially inward of and directly connected to the key portion, a central parallel portion radially inward of and directly connected to the upper parallel portion, and a base portion radially inward of and directly connected to the central parallel portion.

20 Claims, 8 Drawing Sheets

(56) References Cited

U.S. PATENT DOCUMENTS

| | | | | |
|---|---|---|---|---|
| 2012/0000585 | A1 | 1/2012 | Lhospitalier | |
| 2012/0132337 | A1 | 5/2012 | Toulemont et al. | |
| 2012/0168049 | A1* | 7/2012 | Jenkins | B60C 11/1281 152/209.21 |
| 2019/0100059 | A1* | 4/2019 | Kaji | B60C 11/1218 |
| 2019/0160881 | A1* | 5/2019 | Chen | B60C 11/1272 |
| 2021/0379848 | A1* | 12/2021 | Hatano | B29D 30/0606 |

FOREIGN PATENT DOCUMENTS

| | | | | | |
|---|---|---|---|---|---|
| CN | 110494304 | A | | 11/2019 | |
| CN | 111183048 | A | | 5/2020 | |
| DE | 1480932 | A1 | * | 3/1969 | |
| EP | 1555142 | A2 | | 7/2005 | |
| JP | 01-101205 | A | * | 4/1989 | |
| JP | 10-181315 | A | * | 7/1998 | |
| JP | 2001-001722 | A | * | 1/2001 | B60C 11/1218 |
| JP | 2007-223493 | A | * | 9/2007 | B60C 11/1281 |
| JP | 2011526557 | | | 10/2011 | |
| JP | 2013244812 | A | | 12/2013 | |
| JP | 2014-237398 | A | * | 12/2014 | B60C 11/125 |
| JP | 2017193248 | A | | 10/2017 | |
| JP | 2019001343 | A | | 1/2019 | |
| JP | 2020183175 | | | 11/2020 | |
| WO | WO-2013/087440 | A1 | * | 6/2013 | B60C 11/1281 |
| WO | WO-2019/035847 | A1 | * | 2/2019 | B60C 11/1281 |
| WO | WO-2020/129503 | A1 | * | 6/2020 | B60C 11/1218 |

OTHER PUBLICATIONS

Machine translation for WO 2013/087440 (Year: 2025).*
Machine translation for Japan 2014-237398 (Year: 2025).*
Machine translation for Japan 2007-223493 (Year: 2025).*
Machine translation for Japan 10-181315 (Year: 2025).*
Machine translation for Japan 01-101205 (Year: 2025).*
Machine translation for Japan 2001-001722 (Year: 2025).*
Notice of Reasons for Rejection issued in JP2024-521322 on Feb. 7, 2025.
International Search Report and Written Opinion issued in PCT/US22/77733, dated Jan. 20, 2023 (10 pages).
International Preliminary Report on Patentability issued in PCT/US22/77733, dated Apr. 16, 2024 (7 pages).
Extended European Search Report issued in EP22881918 on Aug. 18, 2025.
China National Intellectual Property Administration, Notice of First Examination Opinion issued in Chinese Patent Application No. 202280068191.8, dated Jul. 11, 2026 (12 pages).

* cited by examiner

DIRECTIONAL INTERLOCKING SIPE AND/OR SLOT WITH CHAMFER

CROSS-REFERENCE TO RELATED APPLICATIONS

This application claims priority from U.S. Provisional Patent Application No. 63/256,541, filed on Oct. 16, 2021, which is incorporated by reference herein in its entirety.

BACKGROUND

Tires are often designed to optimize performance in a variety of road conditions. For example, a tire may include tread features that are designed to optimize performance in snow-covered/icy road conditions and dry road conditions.

Obtaining traction in snow and ice may be achieved by providing "biting edges" in the tread of the tire. These "biting edges" are often in the form of sipes or slots. However, too many sipes or slots can lead to a loss of tread block or rib stiffness, which may be undesirable in the performance optimization of the tire, particularly in dry roadway conditions.

Accordingly, what is needed is a tire tread feature to balance snow and ice traction with dry roadway traction.

SUMMARY

In one aspect, a tire is provided, the tire comprising: a tread portion comprising at least one of a tread rib or a tread block, a sipe included in the tread rib or the tread block, the sipe including: a key portion including: a key edge portion angled in a first circumferential direction at an angle KA, and a chamfer portion angled in the first circumferential direction at an angle CA, an upper parallel portion radially inward of and directly connected to the key portion, a central parallel portion radially inward of and directly connected to the upper parallel portion, and a base portion radially inward of and directly connected to the central parallel portion.

In another aspect, a tire is provided, the tire comprising: a tread portion comprising at least one of a tread rib or a tread block, a sipe included in the tread rib or the tread block, the sipe including: a key portion including: a key edge portion angled in a first circumferential direction at an angle KA, and a chamfer portion angled in the first circumferential direction at an angle CA, and wherein the difference between the angle KA and the angle CA is 15 degrees.

In another aspect, a tire sipe blade is provided, the tire sipe blade comprising: an upper mold insertion portion, a lower sipe forming portion including: a key portion radially inward of and directed connected to the upper mold insertion portion, the key portion including a key edge portion angled in a first circumferential direction at an angle KA, and a chamfer portion angled in the first circumferential direction at an angle CA, an upper parallel portion radially inward of and directly connected to the key portion, a central parallel portion radially inward of and directly connected to the upper parallel portion, and a base portion radially inward of and directly connected to the central parallel portion.

BRIEF DESCRIPTION OF THE DRAWINGS

The accompanying figures, which are incorporated in and constitute a part of the specification, illustrate various example aspects, and are used merely to illustrate various example aspects. In the figures, like elements bear like reference numerals.

DETAILED DESCRIPTION

Axes and planes described herein are illustrated in the figures and include a circumferential axis C oriented in the circumferential direction of the tire, a radial axis R oriented in the radial direction of the tire, and an axial axis A oriented in the axial direction of the tire.

Figure 1:
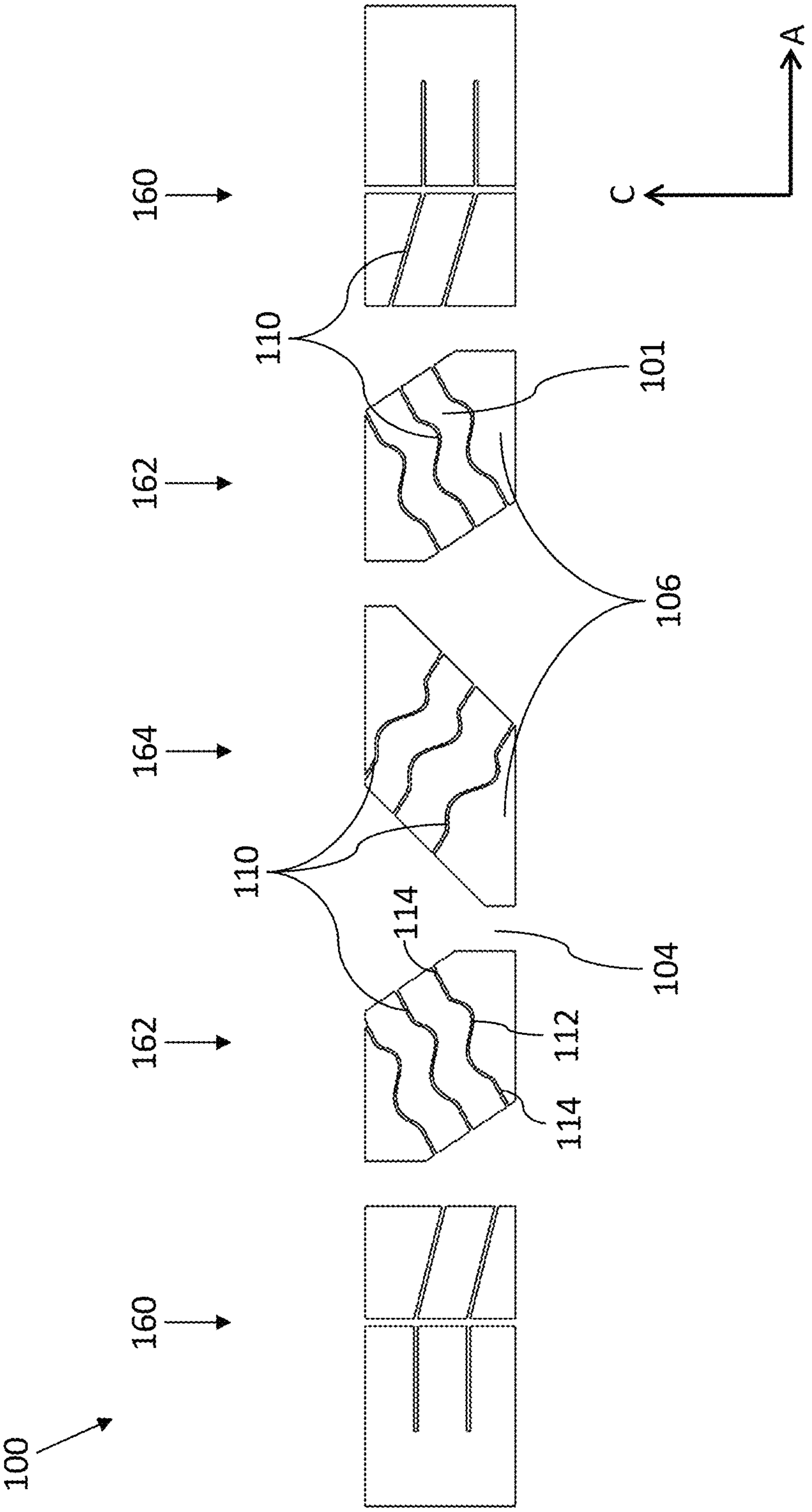
FIG. 1 illustrates a plan view of a tire tread 100 having a tread block 106 with a directional interlocking sipe and/or slot 110.

FIG. 1 illustrates a tire tread 100 having a tread block 106 with a directional interlocking sipe and/or slot with a chamfer 110. Tread 100 includes a tread surface 101, which is the radially outer surface of tread 100 that contacts the driving surface. Tread 100 may include a plurality of blocks 106 oriented in block rows defined by one or more circumferential groove 104, including for example, shoulder rows 160, intermediate rows 162, and one or more center row 164. Alternatively, tire tread 100 may include ribs (defined by one or more circumferential grooves 104) instead of independent blocks 106, the ribs being oriented in the aforementioned shoulder, intermediate, and center orientations.

Tire tread 100 includes one or more directional interlocking sipes and/or slots 110. Sipes and/or slots 110 may include a central s-shaped portion 112 oriented axially between laterally extending straight portions 114. Central s-shaped portion 112 may have a sinusoidal waveform. Sipes and/or slots 110 may include only straight portions 114, as illustrated for example only in shoulder rows 160 of the example tire tread 100. Tire tread 100 may include sipes and/or slots 110 of each arrangement (with a central s-shaped portion 112, or without a central s-shaped portion 112). It is contemplated that these alternative sipe and/or slot arrangements 110 may be contained in differing block rows 160, 162, 164 as illustrated, or may be intermixed within the same block row 160, 162, 164 or even the same block 106.

For brevity and readability, the term "sipe" as used herein is intended to refer a sipe and/or slot, which may refer to any small incision within a tread block or rib and/or any small lateral groove circumferentially separating tread blocks or breaking up a tread rib. The use of the term "sipe" is not intended as excluding slots as used herein.

FIGS. 2A-2E illustrate various possible aspects of sipe blade 230 for forming a directional interlocking sipe and/or slot, including for example sipe and/or slot 110 illustrated in FIG. 1.

Sipe blade 230 includes an upper mold insertion portion 232, and a lower sipe forming portion 234.

Sipe blade 230 terminates radially inwardly in a terminal base portion 239. Sipe blade 230 includes a centerline CL oriented at the center of base portion 239.

Upper portion 232 includes a circumferential tread surface sipe width TSW, which is the width of the sipe (e.g., sipe and/or slot 110) at the tread surface (e.g., tread surface 101). Width TSW may be about 1.00 mm. Width TSW may be 1.00 mm. Width TSW may be between about 0.90 mm and about 1.10 mm. Width TSW may be between 0.90 mm and 1.10 mm. Width TSW may be between about 0.80 mm and about 1.20 mm. Width TSW may be between 0.80 mm and 1.20 mm. Width TSW may be between about 0.70 mm and about 1.30 mm. Width TSW may be between 0.70 mm and 1.30 mm.

Lower portion 234 includes a plurality of portions for forming sipe 110. A key portion 236 is radially inward of and directly connected to upper portion 232. Key portion 236 includes a key edge portion 252 and a chamfer portion 254.

Key edge portion 252 is angled at an angle KA from the circumferential direction, measured tangential to the tread surface (e.g., tread surface 101). Key edge portion 252 is angled in the same direction (e.g., in a first circumferential direction). Angle KA may be about 60 degrees. Angle KA may be 60 degrees. Angle KA may be between about 55 degrees and about 65 degrees. Angle KA may be between 55 degrees and 65 degrees. Angle KA may be between about 50 degrees and about 70 degrees. Angle KA may be between 50 degrees and 70 degrees. Angle KA may be between about 45 degrees and about 75 degrees. Angle KA may be between 45 degrees and 75 degrees.

Chamfer portion 254 is angled at an angle CA from the circumferential direction, measured tangential to the tread surface (e.g., tread surface 101). Chamfer portion 254 is angled in the same direction (e.g., in a first circumferential direction). Angle CA may be about 45 degrees. Angle CA may be 45 degrees. Angle CA may be between about 40 degrees and about 50 degrees. Angle CA may be between 40 degrees and 50 degrees. Angle CA may be between about 35 degrees and about 55 degrees. Angle CA may be between 35 degrees and 55 degrees. Angle CA may be between about 30 degrees and about 60 degrees. Angle CA may be between 30 degrees and 60 degrees.

An upper parallel portion 237 is radially inward of and directly connected to key portion 236. Upper parallel portion 237 may be formed from parallel sipe walls, and may include a width UW. Width UW may be about 0.50 mm. Width UW may be 0.50 mm. Width UW may be between about 0.45 mm and about 0.55 mm. Width UW may be between 0.45 mm and 0.55 mm. Width UW may be between about 0.40 mm and about 0.60 mm. Width UW may be between 0.40 mm and 0.60 mm. Width UW may be between about 0.35 mm and about 0.65 mm. Width UW may be between 0.35 mm and 0.65 mm.

A central parallel portion 238 is radially inward of and directly connected to upper parallel portion 237. Central parallel portion 238 may be formed from parallel sipe walls, and may include a width CW. Width CW may be about 0.30 mm. Width CW may be 0.30 mm. Width CW may be between about 0.25 mm and about 0.35 mm. Width CW may be between 0.25 mm and 0.35 mm. Width CW may be between about 0.20 mm and about 0.40 mm. Width CW may be between 0.20 mm and 0.40 mm. Width CW may be between about 0.15 mm and about 0.45 mm. Width CW may be between 0.15 mm and 0.45 mm.

Upper parallel portion 237 meets central parallel portion 238 with an angle of about, or exactly, 90 degrees. This meeting forms a peak that is oriented at a distance from centerline CL by an offset distance O1. Offset distance O1 may be about 1.30 mm. Offset distance O1 may be 1.30 mm. Offset distance O1 may be between about 1.25 mm and about 1.35 mm. Offset distance O1 may be between 1.25 mm and 1.35 mm. Offset distance O1 may be between about 1.20 mm and about 1.40 mm. Offset distance O1 may be between 1.20 mm and 1.40 mm. Offset distance O1 may be between about 1.15 mm and about 1.45 mm. Offset distance O1 may be between 1.15 mm and 1.45 mm.

A first (radially outer) central parallel portion 238 meets a second (radially inner) central parallel portion 238, forming a peak oriented at a distance from centerline CL by an offset distance O2. Offset distance O2 may be about 0.60 mm. Offset distance O2 may be 0.60 mm. Offset distance O2 may be between about 0.55 mm and about 0.65 mm. Offset distance O2 may be between 0.55 mm and 0.65 mm. Offset distance O2 may be between about 0.50 mm and about 0.70 mm. Offset distance O2 may be between 0.50 mm and 0.70 mm. Offset distance O2 may be between about 0.45 mm and about 0.75 mm. Offset distance O2 may be between 0.45 mm and 0.75 mm.

The second central parallel portion 238 meets a third (radially inner) central parallel portion 238, forming a peak oriented at a distance from centerline CL by an offset distance O3. Offset distance O3 may be about 0.80 mm. Offset distance O3 may be 0.80 mm. Offset distance O3 may be between about 0.75 mm and about 0.85 mm. Offset distance O3 may be between 0.75 mm and 0.85 mm. Offset distance O3 may be between about 0.70 mm and about 0.90 mm. Offset distance O3 may be between 0.70 mm and 0.90 mm. Offset distance O3 may be between about 0.65 mm and about 0.95 mm. Offset distance O3 may be between 0.65 mm and 0.95 mm.

Base portion 239 is radially inward of and directly connected to central parallel portion 238. Base portion 239 is centered upon centerline CL. Base portion 239 may be formed from parallel sipe walls, and may include a width BW. Width BW may be about 0.60 mm. Width BW may be 0.60 mm. Width BW may be between about 0.55 mm and about 0.65 mm. Width BW may be between 0.55 mm and 0.65 mm. Width BW may be between about 0.50 mm and about 0.70 mm. Width BW may be between 0.50 mm and 0.70 mm. Width BW may be between about 0.45 mm and about 0.75 mm. Width BW may be between 0.45 mm and 0.75 mm.

The ratio of TSW to UW may be about, or exactly, 2:1. The ratio of TSW to BW may be about, or exactly, 5:3. The ratio of UW to CW may be about, or exactly, 5:3. The ratio of BW to CW may be about, or exactly, 2:1. The ratio of BW to UW may be about, or exactly, 6:5. The ratio of O1 to O3 may be about, or exactly, 13:8. The ratio of O1 to O2 may be about, or exactly, 13:6. The ratio of O2 to O3 may be about, or exactly, 6:8. The angle between key edge portion 252 (angle KA) and chamfer portion 254 (angle CA) may be about, or exactly, 15 degrees.

Figure 2A:
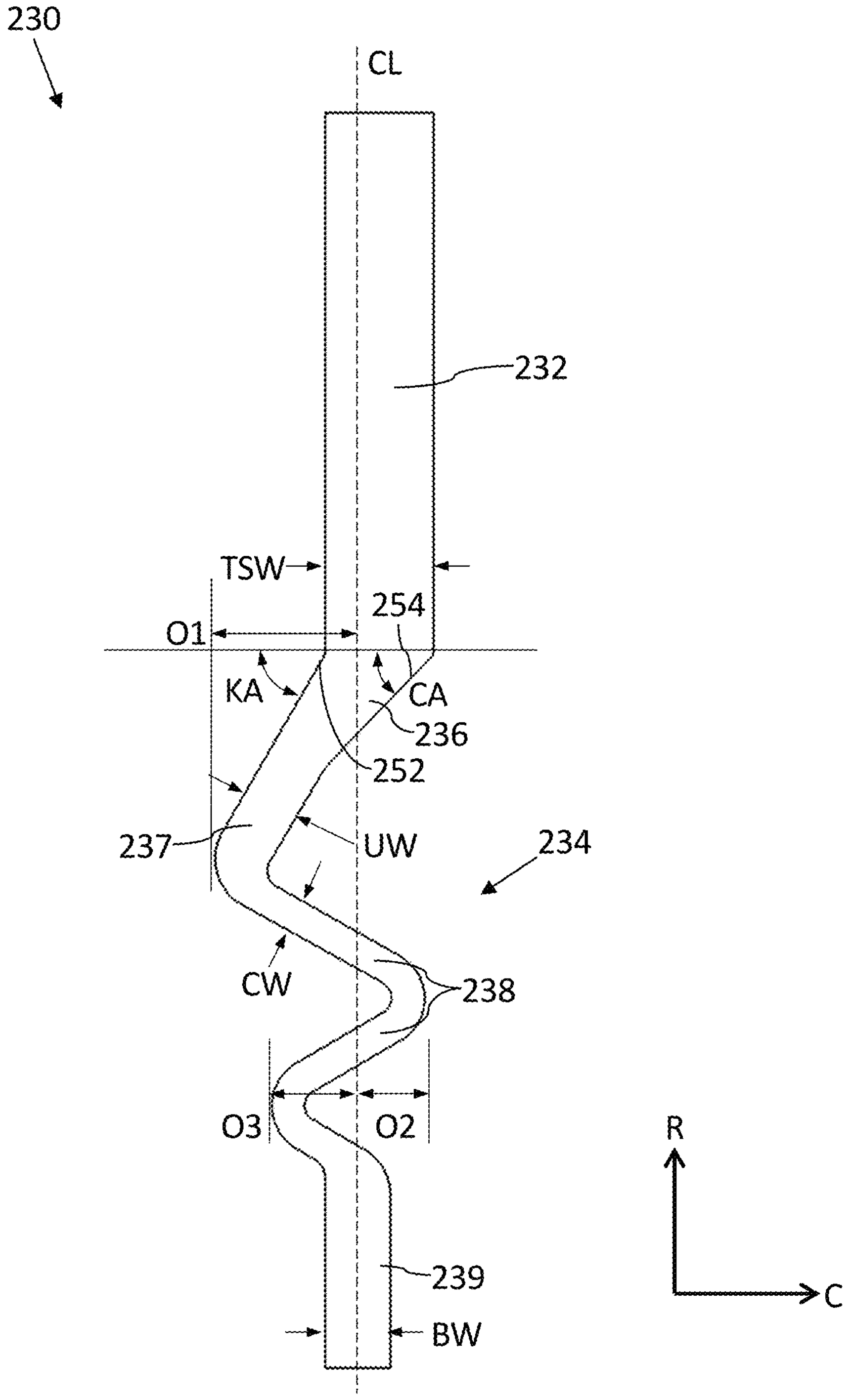
FIG. 2A illustrates an elevation sectional view of a sipe blade 230 for forming a directional interlocking sipe and/or slot.
Figure 2B:
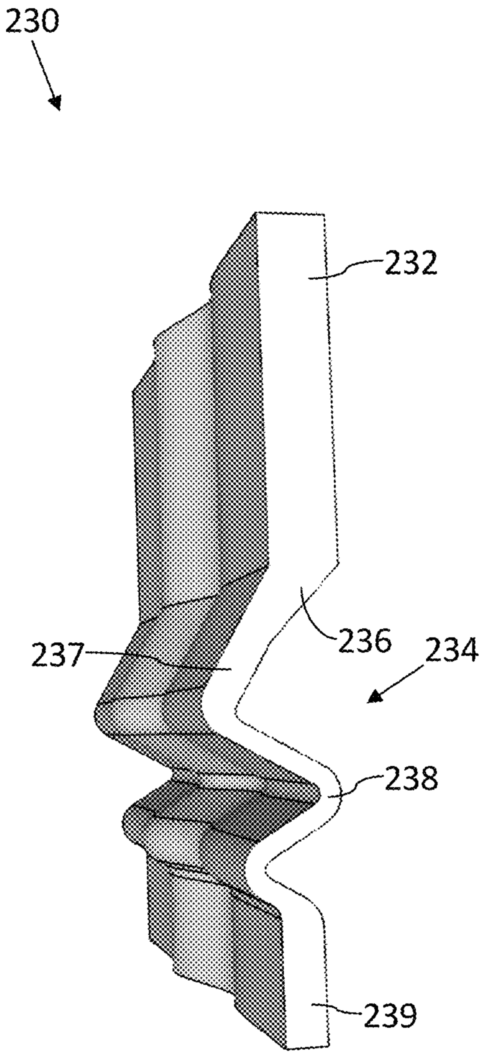
FIG. 2B illustrates a perspective view of sipe blade 230 for forming a directional interlocking sipe and/or slot.
Figure 2C:
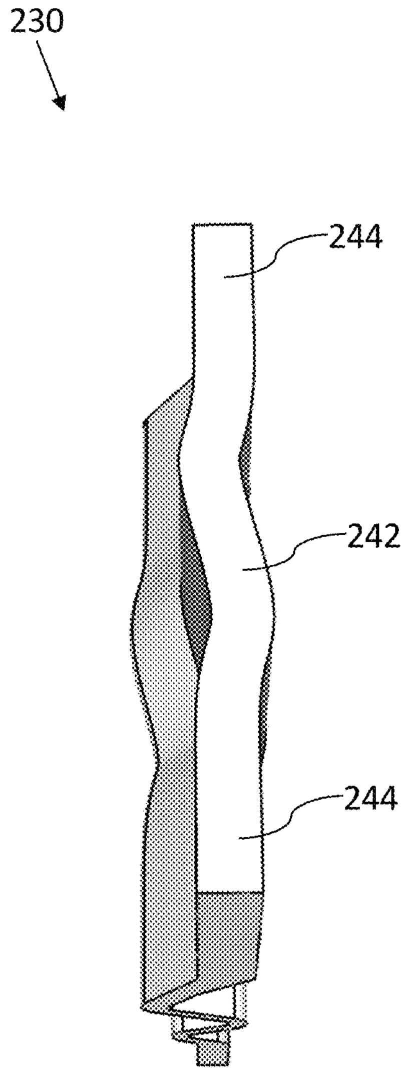
FIG. 2C illustrates a perspective view of sipe blade 230 for forming a directional interlocking sipe and/or slot.
Figure 2D:
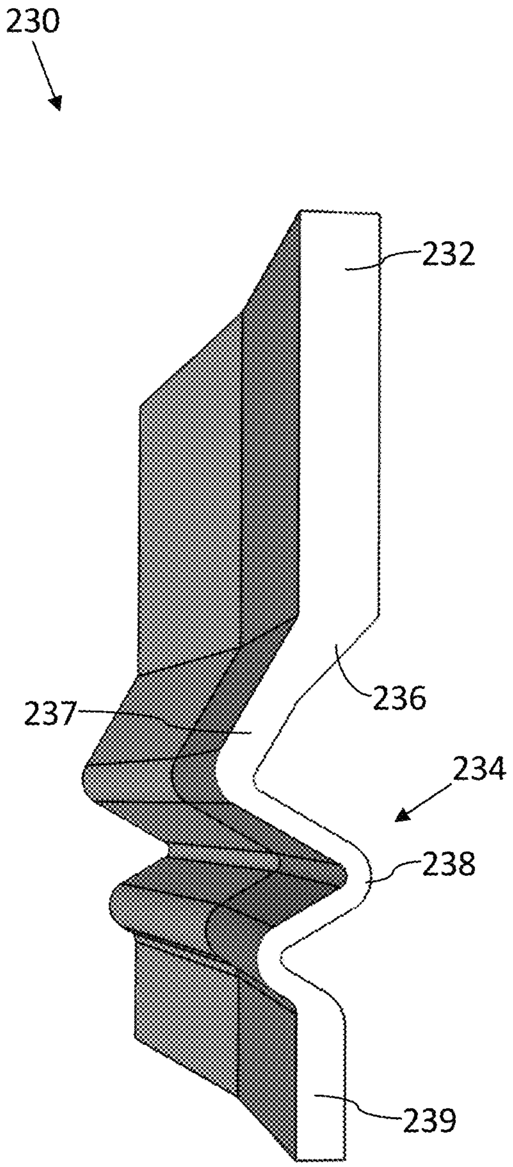
FIG. 2D illustrates a perspective view of sipe blade 230 for forming a directional interlocking sipe and/or slot.

As illustrated in FIG. 2C, sipe blade 230 may include a central s-shaped portion 242 (which may form a sinusoidal waveform) oriented axially between laterally extending straight portions 244.

Figure 2E:
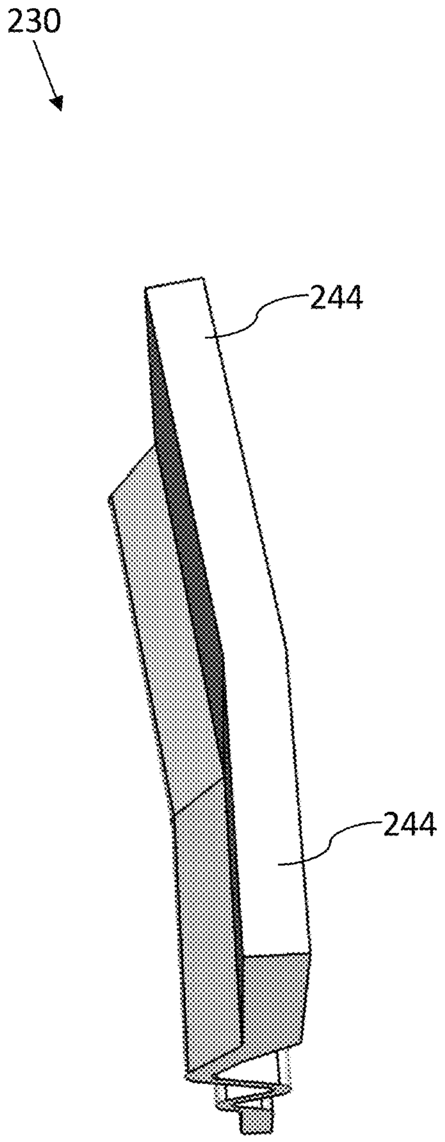
FIG. 2E illustrates a perspective view of sipe blade 230 for forming a directional interlocking sipe and/or slot.
Figure 3A:
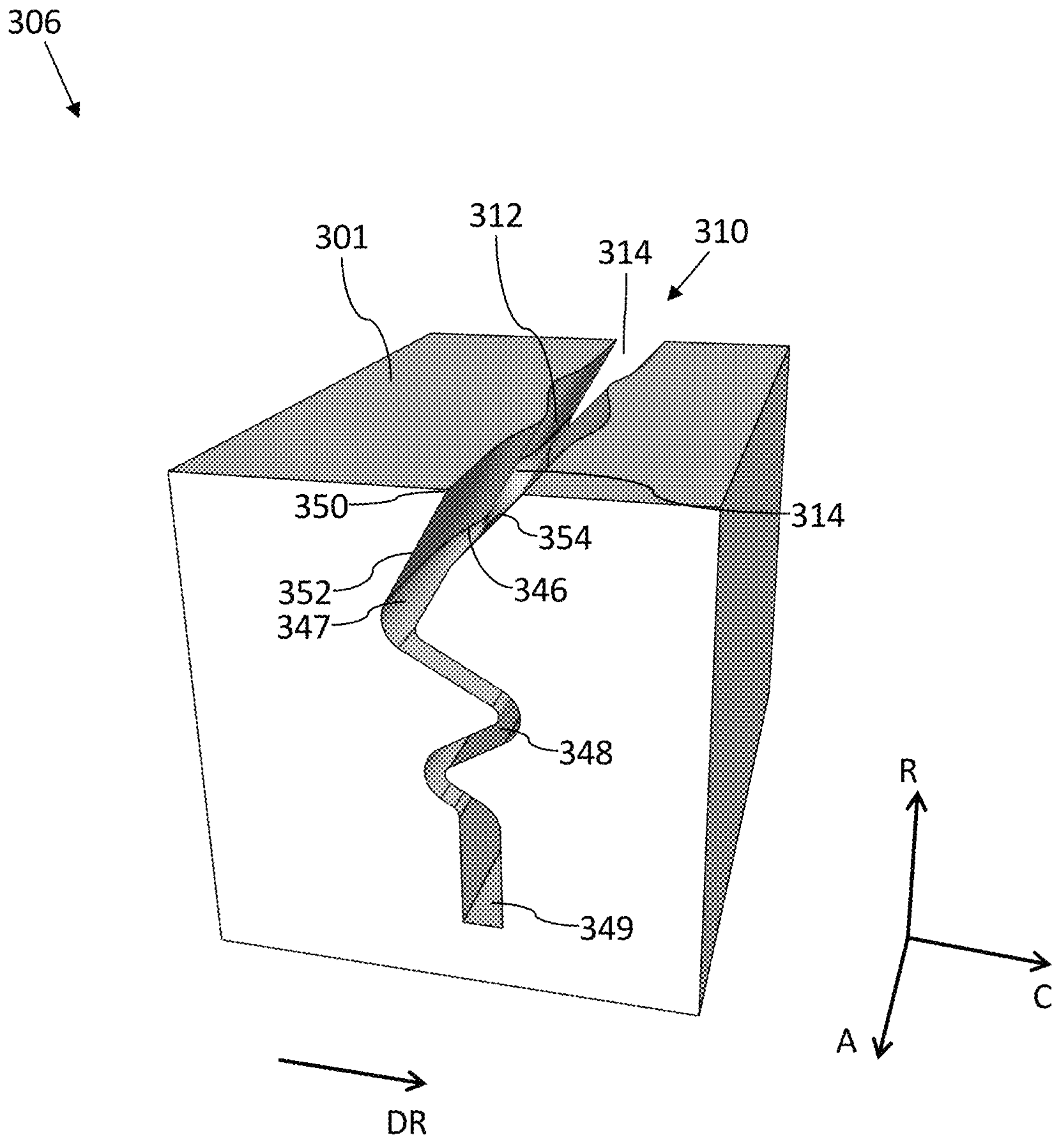
FIG. 3A illustrates a perspective view of a tread block 306 with a directional interlocking sipe and/or slot 310.
Figure 3B:
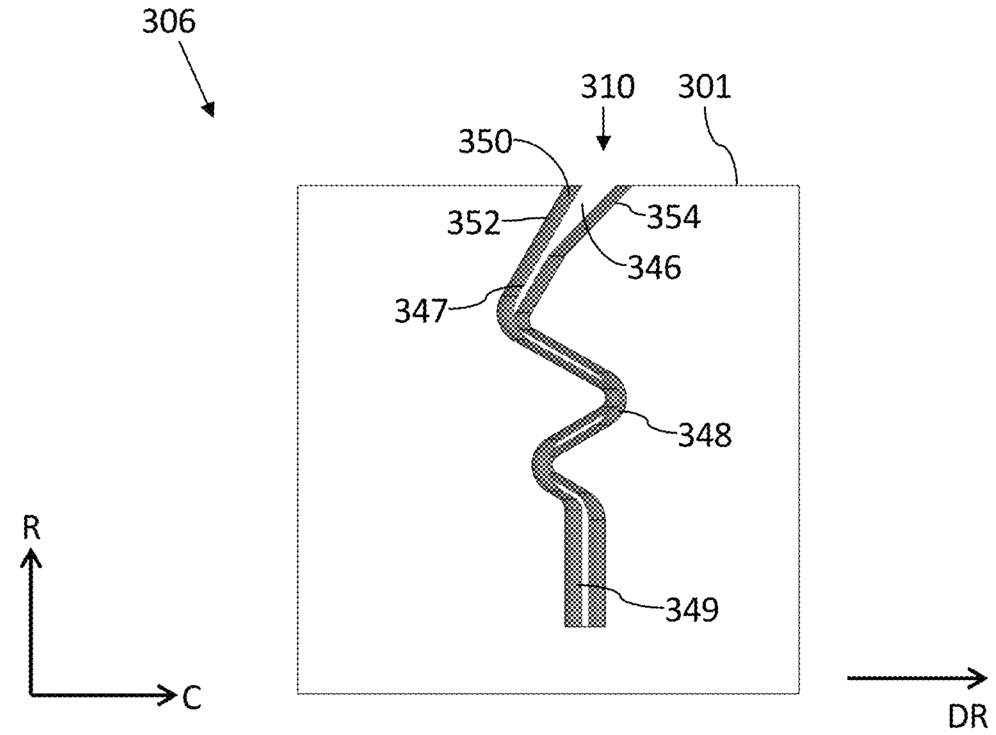
FIG. 3B illustrates an elevation view of tread block 306 with directional interlocking sipe and/or slot 310.
Figure 3C:
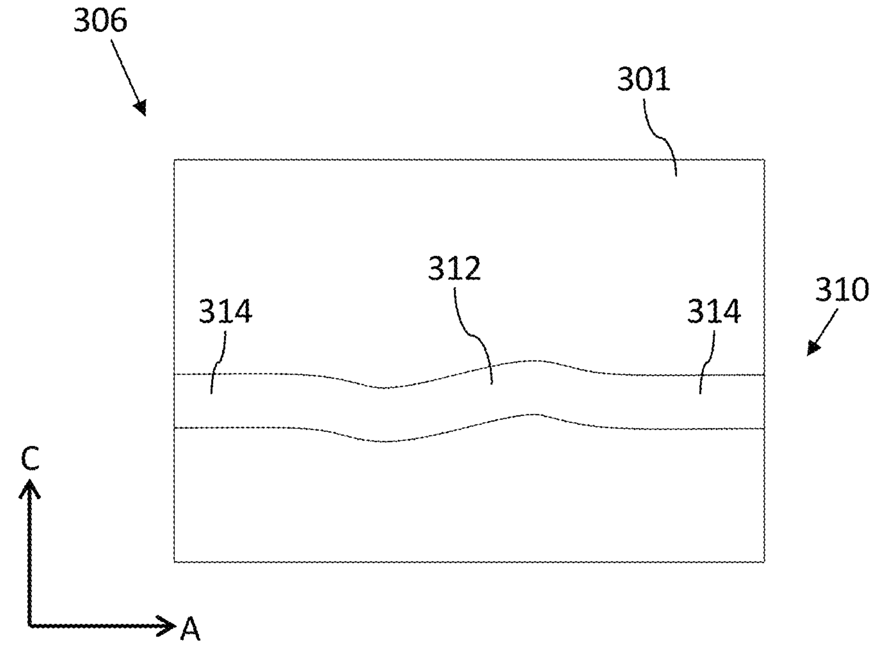
FIG. 3C illustrates a plan view of tread block 306 with directional interlocking sipe and/or slot 310.
Figure 3D:
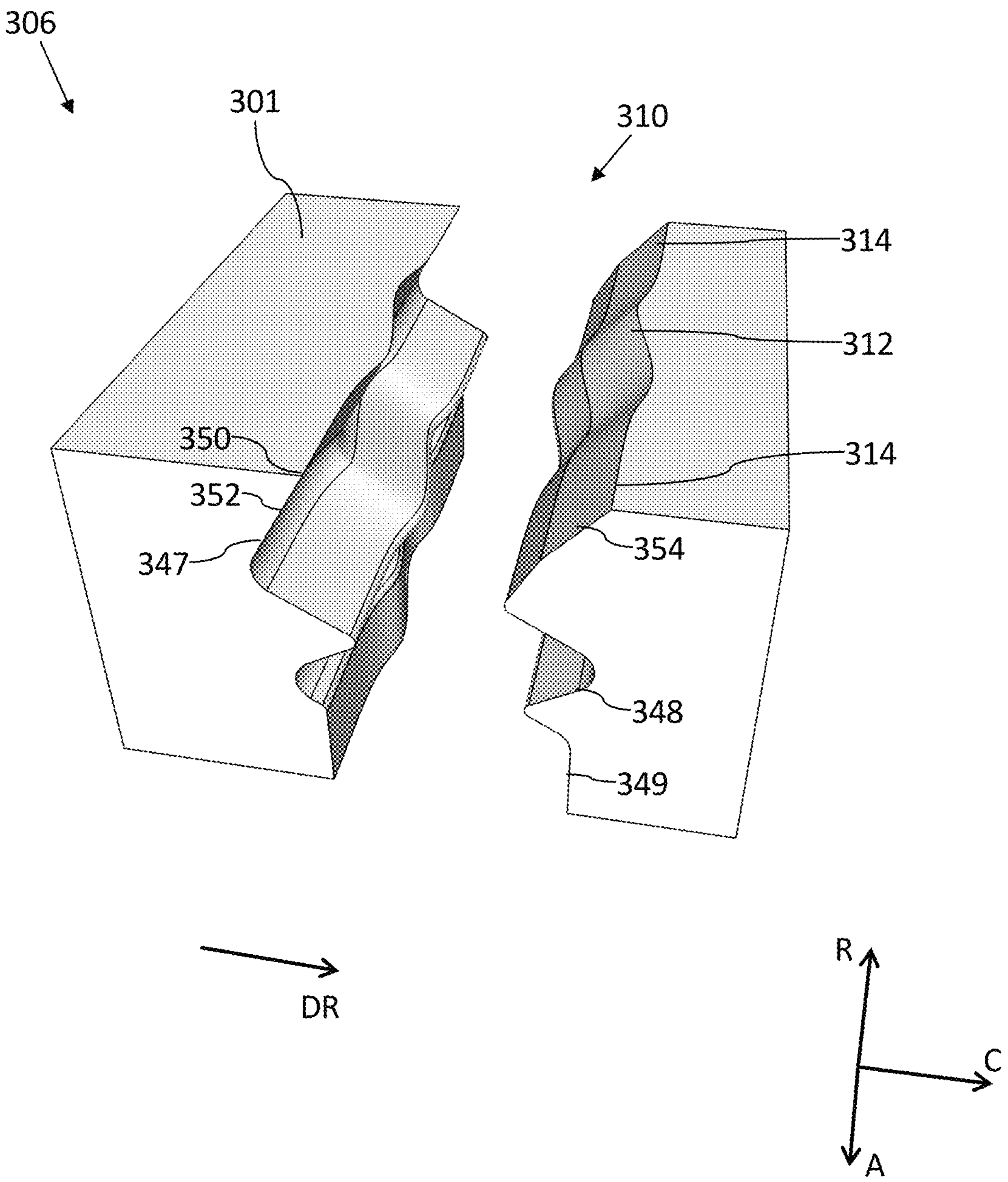
FIG. 3D illustrates an exploded perspective view of tread block 306 with directional interlocking sipe and/or slot 310.
Figure 3E:
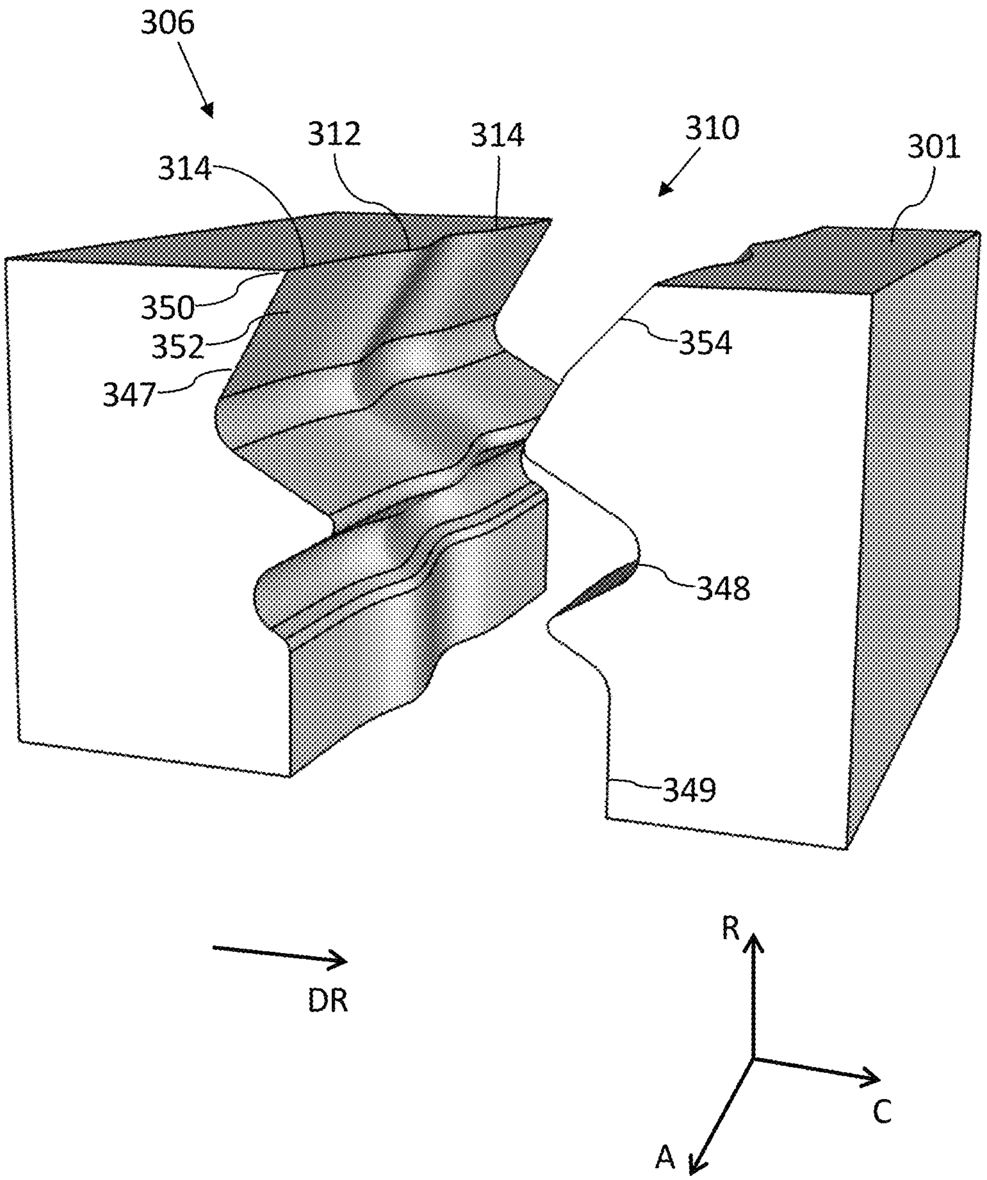
FIG. 3E illustrates an exploded perspective view of tread block 306 with directional interlocking sipe and/or slot 310.

As illustrated in FIG. 2E, sipe blade 230 may include no central s-shaped portion and may include only laterally extending straight portions 244. The two laterally extending straight portions 244 may be angled relative to one another.

FIGS. 3A-3E illustrate a tread block 306 with a directional interlocking sipe and/or slot 310.

Sipe and/or slot 310 extends radially inwardly into tread block 306 from a tread surface 301. Sipe and/or slot 310 may include a central s-shaped portion 312 (which may form a sinusoidal waveform) oriented axially between laterally extending straight portions 314. Sipe and/or slot 310 may include only straight portions 314, as illustrated for example only in FIG. 1, shoulder rows 160 of the example tire tread 100.

Sipe and/or slot 310 includes a key portions 346 as described above in reference to sipe blade 230's key portion 236.

Key portion 346 forms a sharp (acute) key edge 350 where key portion 346 meets tread surface 301. Key edge 350 provides increased traction when tread block 306 engages a roadway in the direction of rolling DR. Key edge 350 provides increased snow and/or ice traction by increasing the friction between tread surface 301 and the snow and/or ice-covered running surface. Key edge 350 may provide increased traction benefits by "biting" into snow and ice surfaces to increase the traction on those surfaces during acceleration in direction of rolling DR. Key edge 350 forms an angle KA (as referenced above in FIG. 2A) relative to tread surface 301.

Key portion 346 additionally includes a key edge portion 352 and a chamfer portion 354 as described above in reference to sipe blade 230's key edge portion 252 and chamfer portion 254. Key edge portion 352 forms an angle KA (as referenced in FIG. 2A) relative to tread surface 301. Chamfer portion 354 forms an angle CA (as referenced in FIG. 2A) relative to tread surface 301. The angle between key edge portion 352 and chamfer portion 354 may be about, or exactly, 15 degrees.

Key edge 350 and key edge portion 352 may be angled in a first circumferential direction. Chamfer portion 354 may also be angled in the first circumferential direction.

Sipe and/or slot 310 includes an upper parallel portion 347 (formed by upper parallel portion 237), a central parallel portion 348 (formed by central parallel portion 238), and a base portion 349 (formed by base portion 239).

With respect to the various aspects described above, a tire tread having a sipe and/or slot with a key edge as described herein has improved traction in snow and/or ice versus tire tread lacking such a feature. Tread having the key edge described herein may have an increased snow traction benefit in the forward direction (accelerating) of rolling DR relative to a standard snow tire. Alternatively, the key edge described may have an increased snow traction benefit in the rearward direction (braking) of rolling DR relative to a standard snow tire, depending upon the orientation of the sipe and/or slot. Additionally, a tire tread having a sipe and/or slot with the chamfer portion as described herein has increased contact area retention under braking, which enhances the braking of the tire.

Prior art designs sought to increase snow traction through tread patterns having a very high lateral edge density and void patterns (that is, extending in the axial direction), which results in decreased dry roadway performance. The sipe and/or slots described herein significantly increase snow performance and allow for tread pattern modifications to reduce lateral edge density, thus reducing and/or eliminating detrimental effects to dry performance. The result is a tread pattern with the aforementioned sipes and/or slots with additional snow performance and dry performance compared to a tread pattern without the aforementioned sipes and/or slots.

Additionally, the alternating shape of key portions and return portions of the sipes and/or slots described herein create interlocking sipe sidewalls that self-contact (interlock) under braking, acceleration, and lateral maneuvers. This interlocking aspect of the tread block may act to increase block rigidity under braking, acceleration, and/or lateral maneuvers.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in tire manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments and aspects thereof, and while the embodiments and aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A tire comprising:

a tread portion comprising at least one of a tread rib or a tread block, a sipe included in the tread rib or the tread block, the sipe including:

a key portion including: a key edge portion angled in a first circumferential direction at an angle KA measured from the circumferential direction tangential to a surface of the tread portion, and a chamfer portion angled in the first circumferential direction at an angle CA measured from the circumferential direction tangential to a surface of the tread portion, an upper parallel portion radially inward of and directly connected to the key portion, a central parallel portion radially inward of and directly connected to the upper parallel portion, wherein the central parallel portion includes a first radially outer central parallel portion, a second central parallel portion, and a third radially inner central parallel portion, and a base portion radially inward of and directly connected to the central parallel portion, wherein the base portion includes a centerline CL at a center of the base portion;

wherein the upper parallel portion meets the central portion at an angle forming a peak oriented at a distance from the centerline CL by an offset distance O1;

wherein the first central parallel portion meets the second central parallel portion forming a peak oriented at a distance from the centerline CL by an offset distance O2;

wherein the second central parallel portion meets the third central parallel portion forming a peak oriented at a distance from the centerline CL by an offset distance O3; and wherein the offset distance O3 is greater than the offset distance O2.

2. The tire of claim 1, wherein the difference between the angle KA and the angle CA is 15 degrees.

3. The tire of claim 1, wherein the sipe has a radially outermost tread surface sipe width TSW, wherein the upper parallel portion has a width UW, and wherein the ratio of the width TSW to the width UW is 2:1.

4. The tire of claim 1, wherein the upper parallel portion has a width UW, wherein the central parallel portion has a width CW, and wherein the ratio of the width UW to CW is 5:3.

5. The tire of claim 1, wherein the base portion has a width BW, wherein the central parallel portion has a width CW, and wherein the ratio of the width BW to CW is 2:1.

6. The tire of claim 1, wherein the offset distance O1 is between 1.15 mm and 1.45 mm.

7. The tire of claim 1, wherein the offset distance O3 is between 0.65 mm and 0.95 mm.

8. The tire of claim 1, wherein the ratio of the offset distance O1 to the offset distance O2 is 13:6.

9. The tire of claim 1, wherein the ratio of the offset distance O1 to the offset distance O3 is 13:8.

10. The tire of claim 1, wherein the ratio of the offset distance O2 to the offset distance O3 is 6:8.

11. A tire comprising:

a tread portion comprising at least one of a tread rib or a tread block, a sipe included in the tread rib or the tread block, the sipe including:

a key portion including: a key edge portion angled in a first circumferential direction at an angle KA measured from the circumferential direction tangential to a surface of the tread portion, and a chamfer portion angled in the first circumferential direction at an angle CA measured from the circumferential direction tangential to a surface of the tread portion, an upper parallel portion radially inward of and directly connected to the key portion, a central parallel portion radially inward of and directly connected to the upper parallel portion, wherein the central parallel portion includes a first radially outer central parallel portion, a second central parallel portion, and a third radially inner central parallel portion, and a base portion radially inward of and directly connected to the central parallel portion, wherein the base portion includes a centerline CL at a center of the base portion;

wherein the upper parallel portion meets the central portion at an angle forming a peak oriented at a distance from the centerline CL by an offset distance O1;

wherein the first central parallel portion meets the second central parallel portion forming a peak oriented at a distance from the centerline CL by an offset distance O2;

wherein the second central parallel portion meets the third central parallel portion forming a peak oriented at a distance from the centerline CL by an offset distance O3;

wherein the offset distance O1 is greater than the offset distance O3; and wherein the offset distance O3 is greater than the offset distance O2.

12. The tire of claim 11, wherein the difference between the angle KA and the angle CA is 15 degrees.

13. The tire of claim 11, wherein the sipe has a radially outermost tread surface sipe width TSW, wherein the upper parallel portion has a width UW, and wherein the ratio of the width TSW to the width UW is 2:1.

14. The tire of claim 11, wherein the upper parallel portion has a width UW, wherein the central parallel portion has a width CW, and wherein the ratio of the width UW to CW is 5:3.

15. The tire of claim 11, wherein the base portion has a width BW, wherein the central parallel portion has a width CW, and wherein the ratio of the width BW to CW is 2:1.

16. The tire of claim 11, wherein the offset distance O2 is between 0.45 mm and 0.75 mm.

17. The tire of claim 11, wherein the offset distance O3 is between 0.65 mm and 0.95 mm.

18. The tire of claim 11, wherein the ratio of the offset distance O1 to the offset distance O2 is 13:6.

19. The tire of claim 11, wherein the ratio of the offset distance O1 to the offset distance O3 is 13:8.

20. The tire of claim 11, wherein the ratio of the offset distance O2 to the offset distance O3 is 6:8.

* * * * *